United States Patent
Hanelt

(10) Patent No.: US 10,637,050 B2
(45) Date of Patent: Apr. 28, 2020

(54) METHOD FOR SIZE-REDUCTION OF SILICON AND USE OF THE SIZE-REDUCED SILICON IN A LITHIUM-ION BATTERY

(71) Applicant: Wacker Chemie AG, Munich (DE)

(72) Inventor: Eckhard Hanelt, Geltendorf (DE)

(73) Assignee: WACKER CHEMIE AG, Munich (DE)

(*) Notice: Subject to any disclaimer, the term of this patent is extended or adjusted under 35 U.S.C. 154(b) by 648 days.

(21) Appl. No.: 14/907,889

(22) PCT Filed: Jul. 25, 2014

(86) PCT No.: PCT/EP2014/066052
§ 371 (c)(1),
(2) Date: Jan. 27, 2016

(87) PCT Pub. No.: WO2015/014749
PCT Pub. Date: Feb. 5, 2015

(65) Prior Publication Data
US 2016/0164085 A1  Jun. 9, 2016

(30) Foreign Application Priority Data

Aug. 2, 2013  (DE) .................... 10 2013 215 257

(51) Int. Cl.
| | |
|---|---|
| H01M 4/38 | (2006.01) |
| C01B 33/02 | (2006.01) |
| C09C 1/28 | (2006.01) |
| H01M 10/052 | (2010.01) |
| H01M 4/134 | (2010.01) |
| H01M 4/1395 | (2010.01) |
| B02C 17/20 | (2006.01) |
| H01M 10/0525 | (2010.01) |
| H01M 4/02 | (2006.01) |

(52) U.S. Cl.
CPC ............ *H01M 4/386* (2013.01); *B02C 17/20* (2013.01); *C01B 33/02* (2013.01); *C09C 1/28* (2013.01); *H01M 4/134* (2013.01); *H01M 4/1395* (2013.01); *H01M 10/052* (2013.01); *H01M 10/0525* (2013.01); *C01P 2002/89* (2013.01); *C01P 2004/03* (2013.01); *C01P 2004/61* (2013.01); *C01P 2004/62* (2013.01); *C01P 2004/64* (2013.01); *C01P 2006/11* (2013.01); *C01P 2006/40* (2013.01); *C01P 2006/80* (2013.01); *H01M 2004/021* (2013.01); *H01M 2004/027* (2013.01); *H01M 2220/20* (2013.01); *H01M 2220/30* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,028,360 A * | 7/1991 | Ito | ................... | C01B 33/187 264/12 |
| 5,570,846 A | 11/1996 | Stehr | | |
| 6,007,869 A | 12/1999 | Schreieder et al. | | |
| 7,789,331 B2 | 9/2010 | Zehavi et al. | | |
| 7,883,995 B2 | 2/2011 | Mitchell et al. | | |
| 8,968,669 B2 * | 3/2015 | Chen | ................... | C01B 13/14 422/187 |
| 2006/0003013 A1 * | 1/2006 | Dobbs | ................... | B02C 17/20 424/489 |
| 2007/0281216 A1 | 12/2007 | Petrat et al. | | |
| 2008/0054106 A1 | 3/2008 | Zehavi et al. | | |
| 2008/0113271 A1 * | 5/2008 | Ueda | ................... | H01M 4/134 429/231.95 |
| 2010/0001106 A1 | 1/2010 | Schaefer et al. | | |
| 2011/0311873 A1 * | 12/2011 | Schulz | ................... | C01B 31/00 429/231.8 |
| 2012/0129054 A1 * | 5/2012 | Huang | ................... | H01M 4/134 429/334 |
| 2012/0258371 A1 | 10/2012 | Nakanishi et al. | | |
| 2012/0270107 A1 * | 10/2012 | Toya | ................... | C01G 53/006 429/223 |
| 2013/0108923 A1 | 5/2013 | Nakanishi et al. | | |
| 2014/0239103 A1 | 8/2014 | Murai et al. | | |

FOREIGN PATENT DOCUMENTS

| | | |
|---|---|---|
| CN | 101495682 A | 7/2009 |
| CN | 101683627 A | 3/2010 |
| CN | 102790206 A | 11/2012 |
| CN | 103531761 A * | 1/2014 |
| EP | 0700724 A1 | 3/1996 |
| EP | 0896952 A1 | 2/1999 |
| EP | 1730800 | 12/2006 |
| JP | 2008112710 A * | 5/2008 |
| JP | 2011132105 A | 7/2011 |
| JP | 2012221758 A | 11/2012 |
| JP | 2013098058 A | 5/2013 |
| TW | 201326479 A1 | 7/2013 |
| WO | 2005096414 A2 | 10/2005 |
| WO | 2009011981 A2 | 1/2009 |
| WO | 2011125250 A1 | 10/2011 |
| WO | 2013040705 A1 | 3/2013 |

OTHER PUBLICATIONS

Doe, JP 201112105 Machine Translation (Year: 2011).*
McGregor, Viscosity: The Basics, Aug. 1, 2009 (Year: 2009).*
Horiba, A Guidbook to Particle Size Analysis, 2012 (Year: 2012).*
Deming et al. (CN103531761) Machine Translation (Year: 2014).*
Anhydrous Ethanol NPL 2013 (Year: 2013).*
Oda et al. (JP 2008-112710) Machine Translation (Year: 2008).*
Ethanol Material Safety Data Sheet (Year: 2001).*
JP 2011132105 A, Abstract.
JP 2012221758 A, US 20120258371 A1.
JP 2013098058 A, US 20130108923 A1.
English language abstract for CN 101683627 A (2010).
English language abstract for CN 102790206 A (2012).
Herbell et al., "Demonstration of a Silicon Nitride Attrition Mill for Production of Fine Pure Si and Si3N4 Powders"; Am. Ceram. Soc. Bull., vol. 63, No. 9, pp. 1176-1178 (1984).
International Search Report for PCT/EP2014/066052 dated Nov. 17, 2014.
Hu, Qingtao. (1982). Non-metallic Materials Science. China Railway Publishing House. p. 382.
English language abstract for JP 2011132105 A (2011).

* cited by examiner

Primary Examiner — Ula C Ruddock
Assistant Examiner — Anna Korovina
(74) Attorney, Agent, or Firm — Caesar Rivise, PC

(57) ABSTRACT

The invention relates to a method for size-reducing silicon, wherein a mixture containing a suspension containing silicon to be size-reduced and silicon grinding media is set in motion in the grinding space of a grinding media mill. The size-reduced silicon is used as the active material in the anode of a lithium-ion battery.

21 Claims, No Drawings

METHOD FOR SIZE-REDUCTION OF SILICON AND USE OF THE SIZE-REDUCED SILICON IN A LITHIUM-ION BATTERY

BACKGROUND OF THE INVENTION

The invention relates to a process for comminuting silicon and also the use of comminuted silicon as active material in lithium ion batteries.

Such a process makes it possible to produce microsize and nanosize silicon particles which are suitable as active material in anodes of lithium ion batteries.

Rechargeable lithium ion batteries are at present the practically usable electrochemical energy stores having the highest energy densities of up to 250 Wh/kg. They are utilized mostly in the field of portable electronics, for tools and for transportation means, for example bicycles or automobiles. However, particularly for use in automobiles, it is necessary to achieve a significant further increase in the energy density of the batteries in order to achieve longer ranges of the vehicles.

As negative electrode material ("anode") in lithium ion batteries, use is made mostly of graphitic carbon. Graphitic carbon has stable cyclic properties and quite high handling safety compared to lithium metal which is used in primary lithium cells. An important argument for the use of graphitic carbon in negative electrode materials is the small volume change of the host material associated with intercalation and deintercalation of lithium, i.e. the electrode remains approximately stable. Thus, a volume increase of only about 10% is measured for intercalation of lithium in graphitic carbon for the limiting stoichiometry of $LiC_6$. However, a disadvantage is its relatively low electrochemical capacity of theoretically 372 mAh/g of graphite, which corresponds to only about one tenth of the electrochemical capacity which is theoretically achievable when using lithium metal.

Silicon and lithium form binary electrochemically active compounds which have a very high lithium content. The theoretical maximum lithium content is found in $Li_{4.4}Si$, which corresponds to a very high theoretical specific capacity of 4199 mAh/g of silicon. The disadvantage of silicon as anode material is that the intercalation and deintercalation of lithium is associated with a very large volume change, which is up to 300%. This volume change leads to severe mechanical stressing of the crystallites and thus to rupturing of the particles with loss of electrical contact.

EP 1730800 B1 discloses, for example, an electrode material for lithium ion batteries, characterized in that the electrode material comprises 5-85% by weight of nanosize silicon particles which have a BET surface area of from 5 to 700 $m^2$/g and an average primary particle diameter of from 5 to 200 nm, 0-10% by weight of conductive carbon black, 5-80% by weight of graphite having an average particle diameter of from 1 μm to 100 μm and 5-25% by weight of a binder, where the proportions of the components add up to a maximum of 100% by weight.

WO 13040705 A1 discloses a process for producing particulate material for use in anodes, which comprises dry milling of particles of an element of the carbon-silicon group to give microsize particles, wet milling of the microsize particles dispersed in a solvent to give nanosize particles (10-100 nm). It is provided for the nanoparticles to be mixed with a carbon precursor and the mixture to be pyrolyzed in order to coat the nanoparticles at least partly with conductive carbon.

A process which has been known for a long time for producing Si nanoparticles is wet milling of a suspension of Si particles in organic solvents by means of a stirred ball mill filled with ceramic or steel milling media (T. P. Herbell, T. K. Glasgow and N. W. Orth, "Demonstration of a silicon nitride attrition mill for production of fine pure Si and $Si_3N_4$ powders"; Am. Ceram. Soc. Bull., 1984, 63, 9, p. 1176). It is stated in this publication that reactions of the material being milled with the suspending liquid can take place during milling. Moreover, the milled material is, depending on its initial and final size, typically contaminated with a few percent by weight of foreign atoms by contact with the mill and in particular wear of the milling media. Silicon is a hard and brittle material for which ceramic milling media such as milling beads composed of yttrium-stabilized zirconium oxide are frequently used. After milling, zirconium can easily be detected in the silicon dispersion by ICP-OES.

Metallic impurities in the electrode may have an adverse effect on the electrochemistry, which can result in the capacity of the battery decreasing significantly over a number of charging and discharging cycles. This effect is referred to in the literature as fading and irreversible loss of capacity.

U.S. Pat. No. 7,883,995 B2 claims a process for producing stable functionalized nanoparticles smaller than 100 nm, with the particles being functionalized during milling in a reactive medium in a ball mill. Alkenes, in particular, are used for functionalizing the particle surface because the double bonds can react particularly easily with open bonds on the fracture surfaces of the particles.

A further known industrial process for producing particles having low contamination by wear from milling media is autogenous comminution in a stirred mill.

EP 0700724 A1 discloses a process for the continuous autogenous milling of a flowable treatment material containing insoluble particles of differing diameters, wherein the treatment material is set into rotation concentrically to an axis in a milling space and wherein insoluble particles of greater diameter are overproportionately concentrated at the wall of the milling space compared to particles of smaller diameter.

Use is made here of stirred ball mills which in each case have a cylindrical vessel in which a stirrer which can be driven at high speed is arranged concentrically. The milling vessel is at least substantially filled with milling media. The treatment material is fed in flowable form, for example as a slowing water, into the vessel at one end and leaves the vessel at the other end. The mixture of treatment material and milling media is set into intensive motion by the stirrer so that intensive milling takes place. The key aspect of the invention is that the particles having a greater diameter are concentrated in the milling space and there are firstly used simultaneously as milling media for milling the particles having a smaller diameter and secondly are themselves abraded on the outside. Thus, no independent milling media of a different type are used. The treatment material is classified outside the mill before milling and sorted into particles having a greater diameter, which are used for milling, and particles having a smaller diameter, which are to be milled. The particles having a greater diameter are introduced into the milling space of the stirred ball mill and remain here. Subsequently, only the preclassified treatment material comprising particles having a smaller diameter is passed through the milling space in order to be milled. Disadvantages of this process are that the milling performance decreases sharply for small particles below one μm and special mills with additional centrifugal separation systems are necessary in order to separate the fine milled material from the coarser milling media. The engineering outlay for autogenous comminution increases significantly with decreasing particle size.

In autogenous milling, milling media composed of the same material as the material being milled are used.

These are generally relatively coarse particles or fragments from a previous milling stage.

However, many materials are not suitable at all as milling media because of their mechanical properties.

U.S. Pat. No. 7,789,331 B2 discloses a process for milling silicon powder by means of a jet mill. The material to be milled is induced to undergo collisions among the particles and with the walls of the mill by gas turbulence, as a result of which the material to be milled is pulverized. It is stated that a particle distribution of from 0.2 to 20 µm was achieved. Polycrystalline silicon granules are also proposed as material to be milled.

However, our own experiments have shown that this particle distribution should be interpreted as meaning that the median of the distribution is about 10 µm (with $d_{10}$=about 5 µm and $d_{90}$=about 17 µm). Smaller particles having a size of less than 1 µm are usually at present in an amount of not more than a few percent in the particle distribution. This is related to the fact that during dry milling particles having a size of less than 1 µm agglomerate strongly because of increasing adhesion. For this reason, in dry milling of very small particles, the milling energy is required mainly for breaking up the agglomerates and the actually intended milling of the primary particles themselves essentially no longer takes place. The production of nanosize particles by dry milling of silicon is therefore very difficult to bring about and uneconomical.

DESCRIPTION OF THE INVENTION

These problems gave rise to the object of the invention.

The object is achieved by a process for comminuting silicon, wherein a mixture containing a suspension comprising a silicon to be comminuted and milling media composed of silicon is set into motion in the milling space of a milling medium mill.

Preferred embodiments of the process are discussed in the following description of the process.

The silicon is comminuted by the movements of the mixture in the milling space of the milling medium mill.

The comminuted or milled silicon formed in the process of the invention can be used as active material in the anode of a lithium ion battery.

The process is suitable for producing silicon particles having a volume-weighted particle size distribution with 50 nm<$d_{50}$<1000 nm and a low level of metallic impurities of less than 1% by weight. Such silicon particles are used as active material in the anode of a lithium ion battery.

For the purposes of the present invention, the determination of the particle size distribution is carried out in accordance with ISO 13320 by means of static laser light scattering using a Horiba LA 950. Here, particular attention has to be paid to the dispersing of the particles in the measurement solution during preparation of the samples so as not to measure the size of agglomerates instead of individual particles. In the case of the Si particles examined here, highly diluted suspensions in ethanol were produced and were treated with 250 W ultrasound for 30 minutes prior to measurement (for example in a Hielscher laboratory ultrasound instrument model UIS250v with ultrasonic probe LS24d5).

For the purposes of the present patent, metallic impurities are undesired contamination of the silicon with metal atoms from the production process. They are to be distinguished from intended doping of the silicon with foreign atoms or silicon-metal alloys.

The determination of the metallic impurities is, for the purposes of the present invention, carried out by means of ICP (inductively coupled plasma) emission spectrometry (Optima 7300 DV, from Perkin Elmer). The samples are for this purpose digested with acid (HF/HNO$_3$) in a microwave oven (Microwave 3000, from Anton Paar). The ICP-OES determination is based on ISO 11885 "Water quality-Determination of selected elements by inductively coupled plasma optical emission spectrometry (ICP-OES) (ISO 11885:2007); German version EN ISO 11885:2009", which is used for analysis of acidic, aqueous solutions (e.g. acidified mains water, wastewater and other water samples, aqua regia extracts of soils and sediments).

For the purposes of the present invention, milling media are bodies which are freely mobile in the mill and ideally only comminute the material to be milled but are themselves not destroyed or destroyed only insignificantly. However, the milling media can be subject to gradual wear, so that they should be replaced after a certain milling time.

The median $d_{50}$ of the diameter of the milling media composed of silicon is preferably from 10 to not more than 1000 times greater than the $d_{90}$ value of the distribution of the material to be milled, with relatively small milling media being better for producing a finer milled material. The maximum particle size of the starting material determines the minimum milling media size and thus the achievable fineness of the end product.

Particular preference is given to milling media which have a diameter $d_{50}$ which is from 20 to 200 times greater than the $d_{90}$ value of the initial distribution of the material being milled.

The median of the volume-weighted size distribution of the milling media required for producing silicon particles having 0.02 µm<$d_{50}$<10 µm is in the range 50 µm<$d_{50}$<5 mm and preferably in the range 100 µm<$d_{50}$<2 mm.

The relative breadth of the volume-weighted size distribution of the milling media is preferably $(d_{90}-d_{10})/d_{50}$<1 and particularly preferably <0.5.

The $d_{10}$, $d_{50}$ and $d_{90}$ values here and elsewhere are the 10%, 50% and 90% percentile values of the volume-weighted diameter size distributions of the milling media or the material being milled.

The milling media can be crushed silicon having a bulk density of typically from about 0.9 to 1.2 g/cm$^3$.

The milling media used in the milling process are preferably characterized in that they are approximately spherical, have a specific gravity of from 2.2 to 2.4 g/cm$^3$ and a bulk density of from 1.2 to 1.7 g/cm$^3$, with the volume-weighted size distribution thereof being in the range 50 µm<$d_{50}$<5 mm and the relative breadth of the distribution $(d_{90}-d_{10})/d_{50}$ being <1.

These properties are satisfied by, in particular, polycrystalline silicon granules. As will be shown later, autogenous milling using silicon granules of the specified size is particularly advantageous since it leads significantly more quickly to nanosize silicon particles having the desired purity than does milling using crushed silicon as milling media.

In addition, it was surprising that the granules do not fracture in the mill under high mechanical stresses and are subject to significantly lower wear compared to crushed silicon. The granules are therefore easier to separate from the milled material than is the crushed silicon and the milling process is significantly more stable.

The approximately spherical milling media composed of silicon used in autogenous wet milling have a sphericity ψ of preferably $0.8<\psi<=1$.

The sphericity ψ is, according to the definition of Wadell, the ratio of the surface area of a sphere of the same volume to the actual surface area of a body. The maximum sphericity ψ=1 corresponds to the ideal spherical shape.

The approximately spherical milling media composed of silicon particularly preferably have a sphericity of $0.9<\psi<=1$.

The international standard of the "Federation Europeenne de la Manutention" gives, in FEM 2.581, an overview of the aspect according to which a bulk material is to be regarded. The standard FEM 2.582 defines the general and specific bulk material properties in respect of classification. Parameters which describe the consistency and state of the material are, for example, particle shape and particle size distribution (FEM 2.581/FEM 2.582: General characteristics of bulk products with regard to their classification and their symbolization).

According to DIN ISO 3435, bulk materials can be divided into 6 different particle shapes according to the nature of the particle edges:
I sharp edges with approximately equal measurements in the three dimensions (e.g.: cube)
II sharp edges of which one is significantly longer than the other two (e.g.: prism, blade)
III sharp edges of which one is significantly smaller than the other two (e.g.: plate, flakes)
IV round edges having approximately equal measurements in the three dimensions (e.g.: sphere)
V round edges which are significantly larger in one direction than the other two (e.g.: cylinder, rod)
VI fibrous, thread-like, lock-like, entangled According to this classification of bulk materials, the milling media composed of silicon which are used for autogenous wet milling are preferably bodies having the particle shape IV.

Since the mass of the material being milled is significantly greater than the abrasion of the milling media, contamination of the milled material by possible metallic impurities in the milling media is greatly diluted. Nevertheless, preference is given to very pure milling media.

The approximately spherical milling media composed of silicon therefore preferably contain a total of less than 5% by weight, particularly preferably less than 1% by weight and very particularly preferably less than 0.1% by weight, of metallic impurities.

The approximately spherical milling media composed of silicon which are used for autogenous wet milling can be produced by various methods.

For example, silicon particles having any shape can be rounded mechanically or by melting and cooling.

The mechanical rounding can be carried out, for example, by autogenous grinding, for example by movement of a large amount of silicon particles having any shape in a stirred vessel or a stirred mill.

Melting and cooling can, for example, occur in a hot plasma through which the silicon particles flow individually. A suitable process is described in WO 2011125250 A1.

The approximately spherical milling media composed of silicon which are used in autogenous wet milling can also be produced directly by vapor deposition of silicon-containing molecules such as silanes. This can, for example, be carried out in a fluidized-bed reactor. A suitable production process is described in EP 0896952 A1.

The approximately spherical milling media composed of silicon which are used in autogenous wet milling are thus preferably granules produced by vapor deposition in a fluidized-bed reactor.

Such granules typically contain less than 10 μg/g of metallic impurities.

For use as milling media, a fraction of the granules which matches the desired particle size of the material being milled is selected, for example by sieving.

The starting material for milling, i.e. the silicon to be comminuted, preferably has a volume-weighted particle size distribution having a $d_{90}<300$ μm, particularly preferably $d_{90}<100$ μm and very particularly preferably $d_{90}<30$ μm.

Elemental silicon is preferably used as starting material for milling because this has the highest storage capacity for lithium ions.

For the purposes of the present invention, elemental silicon is high-purity polysilicon, silicon deliberately doped with a small proportion of foreign atoms (for example B, P, As) or else metallurgical silicon which can have a specified amount of elemental impurities (for example Fe, Al, Ca).

However, a silicon oxide or a binary, ternary or multinary silicon/metal alloy (containing, for example, Li, Na, K, Sn, Ca, Co, Ni, Cu, Cr, Ti, Al, Fe) can also be used as starting material.

If the starting material contains a silicon oxide, then the stoichiometry of the oxide SiOx is preferably in the range $0<x<1.3$. If the starting material contains a silicon oxide having a higher stoichiometry, then the layer thickness of this on the surface is preferably less than 10 nm.

If the silicon in the starting material is alloyed with an alkali metal M, then the stoichiometry of the alloy MxSi is preferably in the range $0<x<5$.

The other metallic impurities in the starting material are preferably present in a total amount of less than 1% by weight, particularly preferably less than 0.5% by weight and very particularly preferably less than 0.1% by weight.

For many applications, Si nanoparticles which are functionalized on the surface by covalently bound organic groups are particularly suitable because the surface tension of the particles can be optimally matched to the medium surrounding the particles, for example the solvents and binders used for the production of electrode coatings, by means of appropriate functionalization.

Various organic or inorganic liquids or liquid mixtures having a viscosity determined in accordance with DIN 53019 at room temperature (20° C.) and 1 bar atmospheric pressure of less than 100 mPas, preferably less than 10 mPas, can be used for milling the silicon of a suspension.

The liquid is preferably inert or weakly reactive towards silicon.

The liquid is particularly preferably organic and contains less than 5% by weight of water, particularly preferably less than 1% of water.

The liquids preferably contain polar groups.

Particular preference is given to alcohols.

The suspension used for milling can contain additional additives which react with the silicon surface and thus functionalize this with organic or inorganic groups.

The suspension used for milling can contain further additives which improve dispersion of the particles in the suspension.

It has been able to be shown that the use of silicon particles produced by autogenous wet milling of silicon in the anodes of lithium ion batteries leads to good cyclic behavior.

These electrodes have a very high reversible capacity which remains approximately constant during the course of cycling, so that only slight fading is observed.

It has also been found that the use of these nanosize silicon particles leads to the electrode material having a significantly improved mechanical stability.

It was surprising that the irreversible capacity loss during the first cycle could be reduced.

The invention therefore also provides an electrode material for a lithium ion battery, which contains silicon particles which have been comminuted by the process of the invention and have a volume-weighted particle size distribution of 50 nm<$d_{50}$<1000 nm and metallic impurities in an amount of less than 1% by weight.

For the purposes of the present invention, electrode material is a material or a mixture of two or more materials which allows electrochemical energy to be stored in a battery by means of oxidation and/or reduction reactions. Depending on whether the electrochemical reaction which provides energy in the charged battery is an oxidation or reduction, the material is referred to as negative or positive electrode material or else an anode or cathode material. The electrode material of the invention preferably contains a mixture of the silicon particles of the invention having a low level of metallic impurities, graphite, a nanosize electrically conductive component, a binder and optionally further components or auxiliaries such as pore formers, dispersants or dopants (e.g. elemental lithium).

The silicon particles in the electrode material can consist of elemental silicon, a silicon oxide or a binary, ternary or multinary silicon/metal alloy (with, for example, Li, Na, K, Sn, Ca, Co, Ni, Cu, Cr, Ti, Al, Fe).

If the silicon particles contain a silicon oxide, then the stoichiometry of the oxide SiOx is preferably in the range 0<x<1.3. If the silicon particles contain a silicon oxide having a higher stoichiometry, then its layer thickness on the surface is preferably less than 10 nm.

When unaggregated silicon particles are alloyed with an alkali metal M, then the stoichiometry of the alloy $M_x$Li is preferably in the range 0<x<5.

For use in electrode materials, particular preference is given to silicon particles according to the invention which contain, in their interior, more than 80 mol % of silicon and less than 20 mol % of foreign atoms, very particularly preferably less than 10 mol % of foreign atoms.

The metallic impurities due to the production process are present in a total amount of less than 1% by weight, preferably less than 0.5% by weight and particularly preferably less than 0.1% by weight.

The surface of the nanosize silicon particles, on the other hand, can be covered by an oxide layer or by other inorganic and organic groups, depending on the production process.

Particularly preferred silicon particles having a low level of metallic impurities bear Si—OH or Si—H groups or covalently bound organic groups such as alkoxy groups or alkyl groups on the surface.

In the literature, various statements concerning the optimum size of the nanosize silicon particles in an electrode material have hitherto been published. In many cases, the judgment dependent on which particle sources were available in each case for the production of the electrodes. Vapor deposition typically produces particles having a diameter of less than 100 nm, while the range above 100 nm is more readily obtainable in the case of milling.

Our own studies have found that the silicon particles are preferably not aggregated and their volume-weighted particle size distribution lies between the diameter percentiles $d_{10}$>20 nm and $d_{90}$<2000 nm and has a breadth $d_{90}$–$d_{10}$ of <1200 nm.

The particle size distribution is particularly preferably in the range from $d_{10}$>30 nm to $d_{90}$<1000 nm and particularly preferably has a breadth $d_{90}$–$d_{10}$<600 nm, with very particular preference being given to from $d_{10}$>40 nm to $d_{90}$<500 nm and $d_{90}$–$d_{10}$<300 nm.

The median of the volume-weighted particle size distribution is preferably in the range 50 nm<$d_{50}$<500 nm.

To reduce the transition resistances within the electrode and between electrode and power outlet lead, the electrode material of the invention can contain 0-40% by weight of an electrically conductive component having nanosize structures of <800 nm.

The electrode material preferably contains 0-30% by weight, particularly preferably 0-20% by weight, of this electrically conductive component.

A preferred electrically conductive component having nanosize structures is a conductive carbon black which contains primary particles which have a volume-weighted particle size distribution between the diameter percentiles $d_{10}$=5 nm and $d_{90}$=200 nm and are branched in a chain-like manner and can form structures having a size up to the µm range.

Other preferred electrically conductive components having nanosize structures are graphenes or carbon nanotubes having a diameter of from 0.4 to 200 nm.

Particularly preferred carbon nanotubes have a diameter of from 2 to 100 nm, with very particular preference being given to diameters of from 5 to 30 nm.

When carbon nanotubes are used as electrically conductive component in the electrode material, it has to be ensured that these are very well dispersed in a suitable solvent before use in an electrode ink or paste, so that they become uniformly distributed in the electrode material and in particular on the surface of the Si nanoparticle.

Preferred binders are polyvinylidene fluoride, polytetrafluoroethylene, polyolefins or thermoplastic elastomers, in particular ethylene/propylene-diene terpolymers. In a particular embodiment, modified celluloses are used as binder.

The processing of the components of the electrode material of the invention to form an electrode ink or paste can be carried out in a solvent such as water, hexane, toluene, tetrahydrofuran, N-methylpyrrolidone, N-ethylpyrrolidone, acetone, ethyl acetate, dimethyl sulfoxide, dimethylacetamide or ethanol or solvent mixtures using rotor-stator machines, high-energy mills, planetary kneaders, stirred ball mills, shaking tables or ultrasonic appliances.

The electrode ink or paste is preferably applied by doctor blade in a dry layer thickness of from 2 µm to 500 µm, particularly preferably from 10 µm to 300 µm, to a copper foil or another current collector.

Other coating methods such as spin coating, dipped coating, painting or spraying can likewise be used.

Before coating of the copper foil with the electrode material of the invention, the copper foil can be treated with a commercial primer, e.g. based on polymeric resins. This increases adhesion to the copper, but itself has virtually no electrochemical activity.

The electrode material is dried into constant weight. The optimum drying temperature depends on the components employed and the solvent used. It is preferably in the range from 20° C. to 300° C., particularly preferably from 50° C. to 150° C.

Finally, the electrode coatings are calendered in order to set a defined porosity.

The present invention further provides a lithium ion battery comprising a cathode, an anode, a membrane arranged as separator between cathode and anode, an electrolyte containing lithium ions, where the anode contains an electrode material according to the invention.

Such a lithium ion battery preferably further comprises two connections on the electrodes and a housing accommodating anode, cathode, separator and electrolyte.

As preferred cathode material, use is made of Li foil, lithium cobalt oxide, lithium nickel oxide, lithium nickel cobalt oxide (doped and undoped), lithium manganese oxide (spinel), lithium nickel cobalt manganese oxides, lithium nickel manganese oxides, lithium iron phosphate, lithium cobalt phosphate, lithium manganese phosphate, lithium vanadium phosphate or lithium vanadium oxides.

The separator is an electrically insulating, ion-permeable membrane as is known in battery production. The separator separates the first electrode from the second electrode.

The electrolyte is a solution of a lithium salt (=electrolyte salt) in an aprotic solvent. Electrolyte salts which can be used are, for example, lithium hexafluorophosphate, lithium hexafluoroarsenate, lithium perchlorate, lithium tetrafluoroborate, $LiCF_3SO_3$, $LiN(CF_3SO_2)$ or lithium borates.

The concentration of the electrolyte salt is preferably in the range from 0.5 mol/l to the solubility limit of the respective salt. It is particularly preferably from 0.8 mol/l to 1.2 mol/l.

As solvents, it is possible to use cyclic carbonates, propylene carbonate, ethylene carbonate, dimethyl carbonate, diethyl carbonate, ethyl methyl carbonate, dimethoxyethane, diethoxyethane, tetrahydrofuran, 2-methyltetrahydrofuran, gamma-butyrolactone, dioxolane, acetonitrile, organic carbonic esters or nitriles, either individually or as mixtures thereof.

The electrolyte preferably contains a film former such as vinylene carbonate, fluoroethylene carbonate, etc., by means of which a significant improvement in the cycling stability of the Si-containing electrode can be achieved.

This is attributed mainly to the formation of a solid electrolyte intermediate phase on the surface of active particles.

The proportion of the film former in the electrolyte is in the range from 0.1% by weight to 20.0% by weight, preferably from 0.2% by weight to 15.0% by weight, particularly preferably from 0.5% by weight to 10% by weight.

The lithium ion battery of the invention can be produced in all customary shapes in rolled, folded or stacked form.

All substances and materials utilized for producing the lithium ion battery of the invention as described above are known. The production of the parts of the battery of the invention and assembly of these to give the battery of the invention are carried out by methods known in the field of battery production.

The invention is illustrated below with the aid of examples.

EXAMPLES

Example 1

A fraction of from 0.85 mm to 1.25 mm was sieved out from approximately spherical polysilicon granules (manufactured by Wacker Chemie AG) containing less than 10 µg/g of metallic impurities.

30 ml of this fraction were introduced into a zirconium oxide-lined milling cup having a capacity of 50 ml.

A mixture of 16 g of ethanol (purity 99.9%) and 10 g of a silicon powder having less than 10 µg/g of metallic impurities was produced.

The silicon powder was produced as per the prior art by premilling of a coarse crushed material from Wacker Produktion of Solar silicon in a fluidized-bed jet mill (Netzsch-Condux CGS16 using 90 m³/h of nitrogen at 7 bar as milling gas). The product obtained had a particle size distribution of $d_{10}=5$ µm, $d_{50}=11$ µm and $d_{90}=18$ µm, which was measured by static laser light scattering using a Horiba LA 950.

This mixture was stirred for 20 minutes until all of the solid was finely dispersed in the suspension and the mixture was subsequently added to the granules in the milling cup.

The milling cup was tightly closed under nitrogen as protective gas.

It was inserted into a Retsch planetary ball mill PM 100 and then set into motion at a speed of rotation of 400 rpm for 240 minutes. Milling was interrupted for 10 minutes every 30 minutes in order to allow the milling cup to cool.

After the milling procedure, the milling cup was emptied into a sieve having a mesh opening of 0.5 mm in order to separate the suspension containing the milled Si particles from the polysilicon granules.

Ethanol was added thereto so that the solids concentration in the suspension was subsequently about 20% by weight.

Measurement of the particle distribution by static laser light scattering using a Horiba LA 950 gave $d_{10}=0.24$ µm, $d_{50}=0.59$ µm and $d_{90}=1.32$ µm in a greatly diluted suspension in ethanol.

About 5 ml of the suspension were dried at 120° C. and 20 mbar in a vacuum drying oven for 16 hours.

The scanning electron micrographs of the milled Si powder showed that the sample consists of individual, unaggregated, splinter-shaped particles.

Scanning electron micrographs of the polysilicon granules showed no visible changes on the milling media.

ICP emission spectroscopy was carried out on the dried powder from the suspension in a Perkin Elmer Optima 7300 DV.

No metallic contamination above the detection limit of 10 µg/g was found.

Comparative Example 1a

The experiment of example 1 was repeated with the polysilicon granules being replaced by zirconium oxide milling beads partially stabilized with yttrium oxide (Alpine Power Beads YSZ 0.8-1 mm).

The measurement of the particle distribution by static laser light scattering using a Horiba LA 950 gave $d_{10}=0.10$ µm, $d_{50}=0.18$ µm and $d_{90}=0.33$ µm in a greatly diluted suspension in ethanol.

About 5 ml of the suspension were dried at 120° C. and 20 mbar in a vacuum drying oven for 16 hours.

The scanning electron micrographs of the milled Si powder showed that the sample consists of individual, unaggregated, splinter-shaped particles.

Scanning electron micrographs of the zirconium oxide milled beads showed no visible changes on the milling media.

ICP emission spectroscopy in a Perkin Elmer Optima 7300 DV indicated a proportion of 10 mg/g of zirconium in the sample.

Comparative Example 1b

The experiment of example 1 was repeated with the polysilicon granules being replaced by steel balls (Netzsch SteelBeads Micro 1.0 mm).

The measurement of the particle distribution by static laser light scattering using a Horiba LA 950 gave $d_{10}=0.17$ µm, $d_{50}=0.31$ µm and $d_{90}=1.03$ µm in a greatly diluted suspension in ethanol.

About 5 ml of the suspension were dried at 120° C. and 20 mbar in a vacuum drying oven for 16 hours.

The scanning electron micrographs of the milled Si powder showed that the sample consists of individual, unaggregated, splinter-shaped particles.

ICP emission spectroscopy in a Perkin Elmer Optima 7300 DV indicated a proportion of 340 mg/g of iron in the sample.

Example 2

A fraction of from 0.3 mm to 0.5 mm was sieved out from approximately spherical polysilicon granules (manufactured by Wacker Chemie AG) which contains less than 10 µg/g of metallic impurities.

The milling space of a laboratory stirred ball mill Netzsch LabStar LS1 using the milling system ZETA ceramic was filled with 490 ml of this fraction and closed.

A mixture of 1600 g of ethanol (purity 99.9%) and 400 g of a silicon powder having less than 10 µg/g of metallic impurities was produced.

The silicon powder had a particle size distribution of $d_{10}=8$ µm, $d_{50}=15$ µm and $d_{90}=25$ µm after premilling in a fluidized-bed jet mill.

The mixture was stirred for 20 minutes until all of the solid was finely dispersed in the suspension.

The suspension composed of silicon powder and ethanol was then introduced into the cooled reservoir of the mill and circulated through the mill by pumping at a throughput of 40 kg/h.

The particles in the suspension were milled at a speed of rotation of the mill of 4000 rpm for 300 minutes.

The subsequent measurement of the particle distribution by static laser light scattering using a Horiba LA 950 gave a size distribution with $d_{10}=90$ nm, $d_{50}=174$ nm and $d_9=320$ nm in a greatly diluted suspension in ethanol.

About 5 ml of suspension were dried at 120° C. and 20 mbar in a vacuum drying oven for 16 hours.

The scanning electron micrographs of the milled Si powder showed that the sample consists of individual, unaggregated, splinter-shaped particles.

Scanning electron micrographs of the polysilicon granules showed no visible changes on the milling media.

However, the mass of the granules decreased by about 14%.

ICP emission spectroscopy was carried out on the dried powder from the suspension in a Perkin Elmer Optima 7300 DV.

Only slight contamination amounting to 70 µg/g of iron was found.

Compared to example 1, this method offers the advantage that relatively large amounts of Si nanoparticles of from a few kg through to the industrial scale can be produced.

Comparative Example 2a

The milling space of a laboratory stirred ball mill Netzsch LabStar LS1 using the milling system ZETA ceramic was filled with 490 ml of zirconium oxide milling beads which were partially stabilized with yttrium oxide and had an average diameter of 0.3 mm (Alpine Power Beads YSZ) and closed.

A mixture of 1600 g of ethanol (purity 99.9%) and 400 g of a silicon powder having less than 10 µg/g of metallic impurities was produced.

The silicon powder had a particle size distribution of $d_{10}=7$ µm, $d_{50}=13$ µm and $d_{90}=24$ µm after premilling in a fluidized-bed jet mill.

The mixture was stirred for 20 minutes until all of the solid was finely dispersed in the suspension.

The suspension composed of silicon powder and ethanol was then introduced into the cooled reservoir of the mill and circulated through the mill by pumping at a throughput of 40 kg/h.

The particles in the suspension were milled at a speed of rotation of the mill of 2500 rpm for 250 minutes.

The subsequent measurement of the particle distribution by static laser light scattering using a Horiba LA 950 gave a size distribution with $d_{10}=82$ nm, $d_{50}=166$ nm and $d_{90}=325$ nm in a greatly diluted suspension in ethanol.

About 5 ml of suspension were dried at 120° C. and 20 mbar in a vacuum drying oven for 16 hours.

The scanning electron micrographs of the milled Si powder showed that the sample consists of individual, unaggregated, splinter-shaped particles.

Scanning electron micrographs of the zirconium oxide milling beads showed no visible changes after milling.

A decrease in mass of the milling media was likewise not observed within the limits of measurement error and can therefore be estimated as being less than 2%.

ICP emission spectroscopy on the dried powder from the suspension was carried out in a Perkin Elmer Optima 7300 DV.

6 mg/g of zirconium and 65 µg/g of iron were detected in the sample.

Example 3

A fraction of from 2 mm to 3.15 mm was sieved out from approximately spherical polysilicon granules (manufactured by Wacker Chemie AG) which contains less than 10 µg/g of metallic impurities.

The milling space of a stirred mill Netzsch LMZ 2 with milling system ZETA in PU configuration was filled with 1000 ml of this fraction and closed.

A suspension composed of 25 kg of ethanol (purity 99.9%) and 7.5 kg of a silicon powder having less than 10 µg/g of metallic impurities was produced.

The silicon powder had a particle size distribution of $d_{10}=18$ µm, $d_{50}=96$ µm and $d_{90}=226$ µm after premilling in a fluidized-bed jet mill.

The ethanol was introduced into the cooled reservoir of the mill and the silicon powder was slowly added while stirring.

The suspension was circulated through the mill by pumping at a throughput of 200 kg/h.

The particles in the suspension were milled at a speed of rotation of the mill of 1900 rpm for 140 minutes.

The subsequent measurement of the particle distribution by static laser light scattering using a Horiba LA 950 gave a size distribution with $d_{10}=3$ µm, $d_{50}=7.3$ µm and $d_{90}=13$ µm in a greatly diluted suspension in ethanol.

About 5 ml of suspension were dried at 120° C. and 20 mbar in a vacuum drying oven for 16 hours.

The scanning electron micrographs of the milled Si powder showed that the sample consists of individual, unaggregated, splinter-shaped particles.

Scanning electron micrographs of the polysilicon granules showed no visible changes on the milling media.

However, the mass of the granules decreased by about 16%.

ICP emission spectroscopy was carried out on the dried powder from the suspension in a Perkin Elmer Optima 7300 DV.

Only slight contamination amounting to about 100 μg/g of iron was found.

Example 4

A fraction of from 2 mm to 3.15 mm was sieved out from crushed metallurgical silicon having less than 20 mg/g of metallic impurities (manufactured by Wacker Chemie AG).

The milling space of a stirred mill Netzsch LMZ 2 with milling system ZETA in PU configuration was filled with 1000 ml of this fraction and closed.

A suspension composed of 25 kg of ethanol (purity 99.9%) and 10 kg of a silicon powder having less than 10 μg/g of metallic impurities was produced.

The silicon powder had a particle size distribution of $d_{10}=18$ μm, $d_{50}=96$ μm and $d_{90}=226$ μm after premilling in a fluidized-bed jet mill.

The ethanol was introduced into the cooled reservoir of the mill and the silicon powder was slowly added while stirring.

The suspension was circulated through the mill by pumping at a throughput of 200 kg/h.

The particles in the suspension were milled at a speed of rotation of the mill of 1950 rpm for 480 minutes.

The subsequent measurement of the particle distribution by static laser light scattering using a Horiba LA 950 gave a size distribution with $d_{10}=2.8$ μm, $d_{50}=7.4$ μm and $d_{90}=14$ nm in a greatly diluted suspension in ethanol.

About 5 ml of suspension were dried at 120° C. and 20 mbar in a vacuum drying oven for 16 hours.

The scanning electron micrographs of the milled Si powder showed that the sample consists of individual, unaggregated, splinter-shaped particles.

The crushed silicon material was polished and rounded during milling. Its mass decreased by about 30%.

ICP emission spectroscopy was carried out on the dried powder from the suspension in a Perkin Elmer Optima 7300 DV.

Compared to example 3, a somewhat greater contamination of about 260 μg/g of iron, 120 μg/g of aluminum and 50 μg/g of calcium was found.

Example 5

Production and Characterization of an Electrode for Li Ion Batteries 4.28 g of an 18.7% strength by weight Si suspension in ethanol as per example 2 and 0.48 g of conductive carbon black (Timcal, Super P Li) were dispersed in 24.32 g of a 1.3% strength by weight solution of sodium carboxymethylcellulose (Daicel, Grade 1380) in water by means of a dissolver at a circumferential velocity of 4.5 m/s for 15 minutes while cooling at 20° C.

After addition of 2.41 g of graphite (Timcal, SFG6), the dispersion was then stirred at a circumferential velocity of 17 m/s for 45 minutes.

After degassing, the dispersion was applied by means of a film drawing frame having a 0.10 nm gap height (Erichsen, model 360) to a copper foil (Schlenk Metallfolien, SE-Cu58) having a thickness of 0.030 mm.

The electrode coating produced in this way was subsequently dried at 80° C. for 60 minutes.

The average weight per unit area of the dry electrode coating was 0.90 mg/cm$^2$.

The electrochemical studies were carried out on a half cell with a three electrode arrangement (zero-current potential measurement).

The electrode coating was used as working electrode, and a lithium foil (Rockwood Lithium, thickness 0.5 mm) was used as reference electrode and counterelectrode.

A 6-layer nonwoven stack (Freudenberg Vliesstoffe, FS2226E) impregnated with 100 μl of electrolyte served as separator.

The electrolyte used consisted of a 1 molar solution of lithium hexafluorophosphate in a 3:7 (v/v) mixture of ethylene carbonate and diethyl carbonate which had been admixed with 2% by weight of vinylene carbonate.

The construction of the cell was carried out in a glove box (<1 ppm $H_2O$, $O_2$), and the water content of all components used was below 20 ppm, based on the dry mass.

Electrochemical testing was carried out at 20° C.

The potential limits used were 40 mV and 1.0 V vs. Li/Li$^+$.

Charging or lithiation of the electrode was carried out at constant current by the cc/cv method (constant current/constant voltage) and, after the voltage limit had been reached, at constant voltage until the current went below 50 mA/g.

Discharging or delithiation of the electrode was carried out at constant current by the cc method (constant current) until the voltage limit had been reached.

At a specific current of 100 mA/g, based on the weight of the electrode coating, a reversible initial capacity of about 600 mAh/g was achieved in this way.

After 100 charging/discharging cycles, the battery still had about 95% of its original capacity.

The invention claimed is:

1. A process for comminuting silicon, wherein: (a) a mixture containing a suspension comprising a silicon to be comminuted and milling media comprising silicon is set into motion in a milling space of a closed milling medium mill, (b) the milling media have a volume-weighted size distribution in a range of 50 μm<d50<5 mm and a relative width of the volume-weighted size distribution of (d90−d10)/d50<1, and (c) silicon particles produced by the process have a volume-weighted particle size distribution in a range of 50 nm<d50<1000 nm, wherein the suspension further comprises an organic liquid comprising at least one alcohol and the mixture comprises less than 5% by weight of water.

2. The process as claimed in claim 1, wherein a median d50 of diameters of the milling media is from 10 to 1000 times greater than a d90 value of a particle size distribution of the silicon to be comminuted.

3. The process as claimed in claim 1, wherein the silicon to be comminuted is a member selected from the group consisting of elemental silicon, doped silicon, metallurgical silicon, silicon oxide, binary silicon-metal alloy, ternary silicon-metal alloy and multinary silicon-metal alloy.

4. The process as claimed in claim 1, wherein the silicon to be comminuted has a volume-weighted particle size distribution having a d90<300 μm.

5. The process as claimed in claim 1, wherein the milling media are silicon particles comprising round edges with approximately equal measurements in three dimensions.

6. The process as claimed in claim 1, wherein the organic liquid has a viscosity of less than 100 mPas at 20° C.

7. The process as claimed in claim 1, wherein the silicon comminuted by the process is used as an active material in an anode of a lithium ion battery.

8. An electrode material for a lithium ion battery, which contains silicon particles which have a volume-weighted particle size distribution with 50 nm<d50<1000 nm and metallic impurities of less than 1% by weight and is produced by the process as claimed in claim 1.

9. A lithium ion battery comprising a cathode, an anode, a membrane arranged as a separator between the cathode and the anode, and an electrolyte containing lithium ions, wherein the anode contains the electrode material as claimed in claim 8.

10. The process as claimed in claim 2, wherein the silicon to be comminuted is a member selected from the group consisting of elemental silicon, doped silicon, metallurgical silicon, silicon oxide, binary silicon-metal alloy, ternary silicon-metal alloy and multinary silicon-metal alloy.

11. The process as claimed in claim 10, wherein the silicon to be comminuted has a volume-weighted particle size distribution having a d90<300 µm.

12. The process as claimed in claim 11, wherein the milling media are silicon particles comprising round edges with approximately equal measurements in three dimensions.

13. The process as claimed in claim 12, wherein the organic liquid has a viscosity of less than 100 mPas at 20° C.

14. The process as claimed in claim 13, wherein the silicon comminuted by the process is used as an active material in an anode of a lithium ion battery.

15. An electrode material for a lithium ion battery, which contains silicon particles which have a volume-weighted particle size distribution with 50 nm<d50<1000 nm and metallic impurities of less than 1% by weight and is produced by the process as claimed in claim 13.

16. A lithium ion battery comprising a cathode, an anode, a membrane arranged as a separator between the cathode and the anode, and an electrolyte containing lithium ions, wherein the anode contains the electrode material as claimed in claim 15.

17. The process as claimed in claim 1, wherein the silicon particles produced by the process have metallic impurities of less than 1% by weight.

18. The process as claimed in claim 1, wherein the suspension further comprises an organic liquid and the mixture comprises less than 1% by weight of water.

19. The process as claimed in claim 1, wherein the relative width of the volume-weighted size distribution of the milling media is (d90−d10)/d50<0.5.

20. The process as claimed in claim 1, wherein the volume-weighted size distribution of the milling media is in a range of 50 µm<d50<2 mm.

21. The process as claimed in claim 6, wherein the volume-weighted particle size distribution of the silicon particles produced by the process is in a range of 50 nm<d50<500 nm.

* * * * *